United States Patent
Bermudez et al.

(10) Patent No.: US 10,605,905 B2
(45) Date of Patent: Mar. 31, 2020

(54) OCCUPANCY ESTIMATION USING NONPARAMETRIC ONLINE CHANGE-POINT DETECTION, AND APPARATUSES, SYSTEMS, AND SOFTWARE FOR SAME

(71) Applicants: Sergio Bermudez, Boston, MA (US); Yang Li, Georgetown, MA (US); Mai Abdelhakim, McDonald, PA (US)

(72) Inventors: Sergio Bermudez, Boston, MA (US); Yang Li, Georgetown, MA (US); Mai Abdelhakim, McDonald, PA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 412 days.

(21) Appl. No.: 15/482,192

(22) Filed: Apr. 7, 2017

(65) Prior Publication Data
US 2018/0292520 A1 Oct. 11, 2018

(51) Int. Cl.
*G01S 13/04* (2006.01)
*G08B 13/24* (2006.01)
(Continued)

(52) U.S. Cl.
CPC .............. *G01S 13/04* (2013.01); *F24F 11/30* (2018.01); *G01S 13/56* (2013.01);
(Continued)

(58) Field of Classification Search
CPC combination set(s) only.
See application file for complete search history.

(56) References Cited

U.S. PATENT DOCUMENTS 7,884,727 B2 2/2011 Tran
10,064,013 B2 * 8/2018 Wootton ............... H04W 64/00
(Continued)

FOREIGN PATENT DOCUMENTS

WO 2009128002 A1 10/2009
WO 2016066820 A1 5/2016

OTHER PUBLICATIONS

Ross, Gordon J., "Parametric and Nonparametric Sequential Change Detection in R: The cpm Package", Journal of Statistical Software, Aug. 1, 2015, pp. 1-20.
(Continued)

*Primary Examiner* — Mamadou L Diallo
(74) *Attorney, Agent, or Firm* — Yutian Ling

(57) ABSTRACT

Systems, methods, and software for determining whether or not a monitored space is occupied by one or more humans and/or animals. In some embodiments, one or more radio-frequency (RF) receivers monitor(s) one or more RF frequencies for changes in received signal strength that may be due to changes in occupancy of the space being monitored. The received signal strength is analyzed using nonparametric online change-point detection analysis to determine change-points in the received signal(s). One or more statistical measures of the received signal(s), such as mean and variance, are used in conjunction with the change-point detection to determine a probability that the occupancy of the monitored space has changed. In some embodiments, additional sensors and/or machine learning can be used to enhance the performance of the disclosed occupancy-detection methodologies.

22 Claims, 8 Drawing Sheets

(51) Int. Cl.
  *G08B 25/08*  (2006.01)
  *G01S 13/56*  (2006.01)
  *F24F 11/30*  (2018.01)
  *H05B 37/02*  (2006.01)
  *F24F 120/10* (2018.01)

(52) U.S. Cl.
  CPC ......... *G08B 13/2491* (2013.01); *G08B 25/08* (2013.01); *H05B 37/0227* (2013.01); *F24F 2120/10* (2018.01)

(56) References Cited

U.S. PATENT DOCUMENTS

| 10,242,563 | B2* | 3/2019 | MacKenzie | G01S 13/003 |
|---|---|---|---|---|
| 2004/0080415 | A1* | 4/2004 | Sorensen | G01V 3/12 340/541 |
| 2005/0055568 | A1 | 3/2005 | Agrawala et al. | |
| 2018/0324595 | A1* | 11/2018 | Shima | H04W 16/10 |

OTHER PUBLICATIONS

Damp, Stephan, International Search Report and Written Opinion of the International Searching Authority for PCT/US2018/025797, dated Jul. 4, 2018, European Patent Office, Rijswijk, The Netherlands, 14 pages.

Barros, Daniel B. et al., "Average Room Occupancy Rate and its relation with Received Signal Strength Indicator in Wireless Sensors Networks," Revista de Radiodifusao, vol. 9, No. 10, 2015, pp. 32-35.

Erdogan, Senol Zafer et al., "Intelligent Monitoring Using Wireless Sensor Networks," EUC Workshops 2007, LNCS 4809, pp. 389-400.

Mrazova, Bojan et al., "Device-free indoor human presence detection method based on the the information entropy of RSSI variations," IEEE Electronics Letters vol. 49, Issue 22, Oct. 24, 2013, pp. 1386-1388.

* cited by examiner

OCCUPANCY ESTIMATION USING NONPARAMETRIC ONLINE CHANGE-POINT DETECTION, AND APPARATUSES, SYSTEMS, AND SOFTWARE FOR SAME

FIELD OF THE APPLICATION

The present application generally relates to the field of occupancy estimation. In particular, the present application is directed to occupancy estimation using nonparametric online change-point detection, and apparatuses, systems, and software for same.

BACKGROUND

Being able to detect occupancy within a monitored space, such as a room, is a common feature of multiple tasks, from lighting control to energy optimization to security monitoring, among others. Current occupancy-detection technologies present multiple disadvantages with respect to their ability to reliably detect when a room or other space is occupied by one or more people and/or animals.

Conventional occupancy-detection is typically performed using any one or more of a variety of sensors. There are a multitude of sensors that can be used to detect occupancy, including passive infrared (PIR) sensors, ultrasonic sensors, thermal imaging cameras, and visible-light cameras. Each of these sensors has certain disadvantages. A PIR sensor, for example, is reliable for detecting movement, but if a person is in a space and does not move for some period, then the PIR sensor will not be able to detect that person's presence. Due to this disadvantage, PIR sensors are typically used in conjunction with timers to keep a space lit in lighting control applications. Ultrasonic sensors have similar performance to PIR sensors, but their range is longer, they have a larger form factor, require more energy to operate, and are more expensive. Thermal imagers solve the issue presented by PIR sensors for detecting occupancy with an immobile person, but they have the disadvantages of being more expensive and complicated to use. In addition, thermal imagers' performance is affected by background thermal changes, which can trigger false-positive occupancy detection. For example, if a window (a high heat transfer element) is within the coverage area of the sensor, the window's thermal profile can trigger the sensor. Video cameras can be a very reliable way to detect occupancy, but they require large computational infrastructure and direct line of sight for the image processing needed to recognize human and/or animal forms. In addition, video cameras raise privacy concerns, such as when using them in bathrooms or other areas where privacy is expected.

SUMMARY OF THE DISCLOSURE

In one implementation, the present disclosure is directed to a method. The method includes receiving radio frequency (RF) energy within a monitored space, generating a time-series RF signal based on the RF energy received, performing a nonparametric online change-point detection algorithm on the time-series RF signal to detect a change-point in the RF signal, determining whether or not a change in occupancy of the monitored space has occurred based on the change-point, and outputting a change-in-occupancy signal in response to determining that a change in occupancy of the monitored space has occurred.

In another implementation, the present disclosure is directed to a non-transitory machine-readable storage medium containing machine-readable instructions configured to cause a processor to perform operations including generating a time-series radio-frequency (RF) signal based on RF energy received by an RF receiver in a monitored space, performing a nonparametric online change-point detection algorithm on the time-series RF signal to detect a change-point in the RF signal, determining whether or not a change in occupancy of the monitored space has occurred based on the change-point, and generating a change-in-occupancy signal in response to determining that a change in occupancy of the monitored space has occurred.

In yet another implementation, the present disclosure is directed to a system. The system includes a radio frequency (RF) receiver configured to receive RF energy within a monitored space, and an RF occupancy analyzer configured to analyze the RF energy using a nonparametric online change-point detection algorithm to determine a change in occupancy within the monitored space and to output a change-in-occupancy signal corresponding to the change in occupancy.

BRIEF DESCRIPTION OF THE DRAWINGS

For the purpose of illustrating the various embodiments, the drawings show aspects of one or more embodiments as described herein. However, it should be understood that the present application is not limited to the precise arrangements and instrumentalities shown in the drawings, wherein.

DETAILED DESCRIPTION

In some aspects, the present application is directed to methods of determining changes in occupancy of a defined space based on detecting change-points in one or more radio frequency (RF) signals. In the context of this disclosure and appended claims, the term "occupancy" means the presence or lack of presence of one or more people and/or one or more animals (e.g., domestic pets, zoo animals, farm animals, etc.) within a monitored space. "Occupancy," however, does not concern furniture, fixtures, and other inanimate objects. A "change in occupancy" is the addition of one or more people and/or animals to the monitored space and the subtraction of one or more people and/or animals to the monitored space. Examples of changes in occupancy include, but are not limited to, one or more people or animals entering an unoccupied monitored space, one or more people or animals leaving the monitored space so that the monitored space is then unoccupied, and a change in the number of people present in an occupied monitored space, among others. A "monitored space" is any space that is monitored using a method of the present disclosure, such as a room or other space (e.g., a foyer, hallway, stairwell, etc.) within a building, an interior region of a stadium, an interior region of a barn, and an exterior region of a building or other structure, among many others. Fundamentally, there is no limitation on the character and nature of a monitored space other than it can be monitored in accordance with various embodiments.

Figure 1:
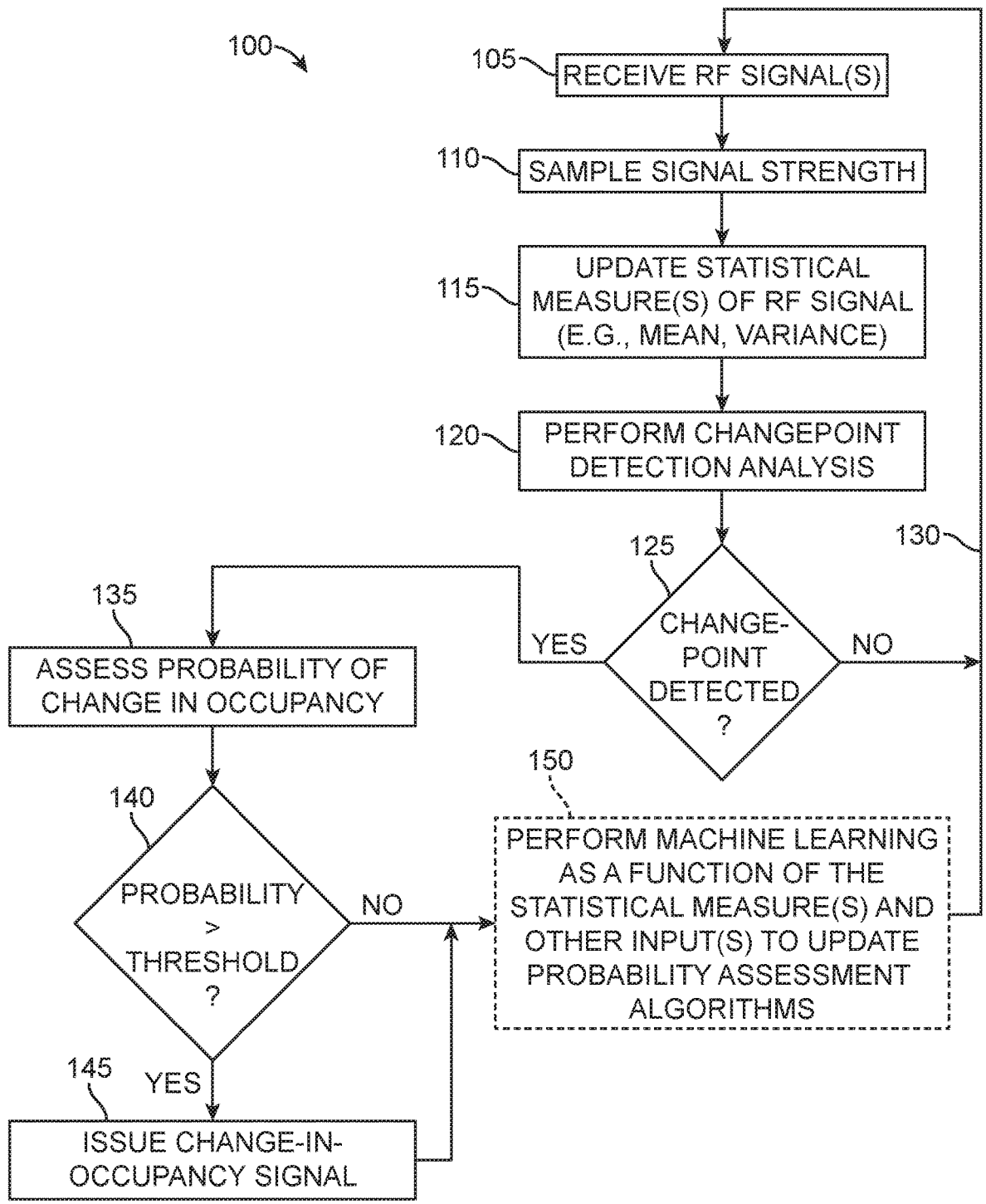
FIG. 1 is a flow diagram illustrating an example radio-frequency (RF) based occupancy-detection method in accordance with various embodiments.
Figure 2:
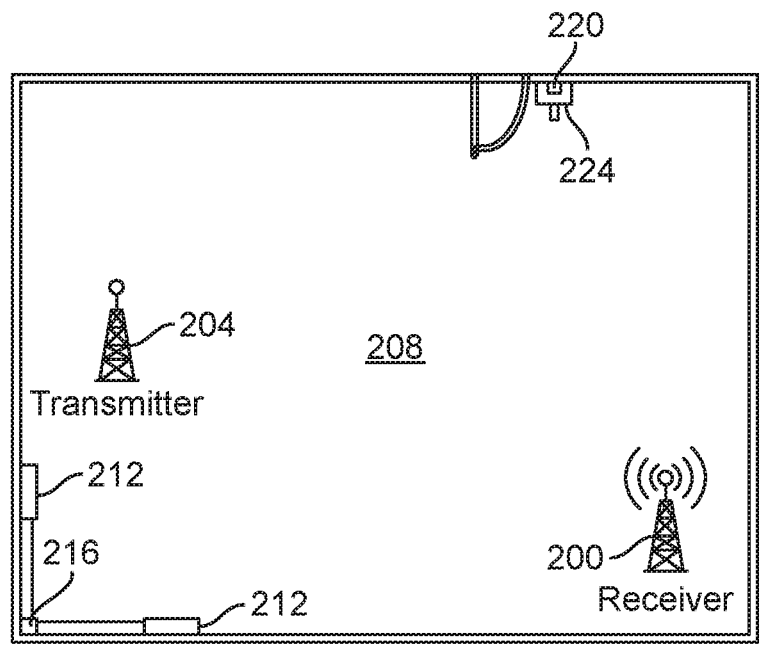
FIG. 2 is a diagram illustrating an example change-point-detection-based occupancy-detection scenario involving a room and an occupancy-detection system that includes at least one RF transmitter fixed relative to the room and an RF receiver that receives RF signals from the RF transmitter(s)

FIG. 1 illustrates an example occupancy-detection method 100 in accordance with various embodiments. The method 100 may be performed by an occupancy-detection system as described herein that includes one or more processors, RF receivers, and RF transmitters. At step 105, one or more RF signals are received. The RF signals are received by one or more RF receivers on one or more target frequencies. The RF signal(s) received may be of any one or more of a variety of types. For example and as described below in detail, in some embodiments at least one of the RF signals received is from one or more RF transmitters to which the RF receiver(s) is(are) intentionally matched. An example scenario using a single RF receiver 200 and a single matched RF transmitter 204 is illustrated in FIG. 2. In FIG. 2, RF receiver and transmitter 200 and 204, respectively, are located within a room 208 (i.e., monitored space) of a building (not shown) monitored for occupancy. For example, occupancy-detection method 100 may be used to control luminaires 212 within room 208 based on the room 208 being occupied. For example, a lighting controller 216 may be provided to turn luminaires 212 on when room 208 is initially occupied and to turn the luminaires 212 off when the room 208 becomes unoccupied. In this scenario, RF transmitter 204 and RF receiver 200 are tuned to the same RF frequency(ies) and the RF transmitter transmits one or more RF signals continuously or intermittently, while the RF receiver receives such signal(s).

As those skilled in the art will readily understand, each person or animal within room 208 can affect the intensity of the RF signal(s) as received by RF receiver 200. For example, each person or animal can absorb a portion of the RF signal(s), can occlude a portion of the RF signal(s) reaching receiver 200, and can cause additional reflections of the RF signal(s) within the room, and each of these can measurably affect the strength of the RF signal(s) that the RF receiver 200 receives. As described below in detail, method 100 utilizes changes in signal strength of the RF signal(s) it receives as a basis of determining occupancy of room 208. It is noted that RF receiver and transmitter 200 and 204, respectively, can be placed in fixed locations within room 208 that tend to cause a person or animal, when present in the room, to bring about the greatest change in the signal strength of the received RF signal(s) relative to the signal strength of the received RF signal(s) when the room is unoccupied.

RF transmitter 204 need not necessarily be provided solely for the purpose of enabling method 100. Rather, RF transmitter 204 may be a transmitter provided for another purpose, such as a transmitter associated with a wireless node on a network, such as a sensor network (e.g., ZIG-BEE® (IEEE 802.15.4 standard) network or a WI-FI® (IEEE 802-11 standard) router on a computer network, among others. It is further noted that multiple RF transmitters (not shown) can be used in place of single RF transmitter 204. Such RF transmitters can be all tuned to transmit at the same frequency(ies) or some or all may be tuned to transmit at one or more frequencies different from the frequency(ies) of others of the RF transmitters. Similarly, single RF receiver 200 can be replaced by multiple RF receivers (not shown), and such RF receivers can be all tuned to receive signals of the same frequency(ies) or some or all may be tuned to receive signals of one or more frequencies different from the frequency(ies) of others of the RF receivers. As those skilled in the art will understand from reading this entire disclosure, methodologies utilized in occupancy-detection method 100 are not restricted to any limitations on the number of RF transmitters and RF receivers used.

Figure 3:
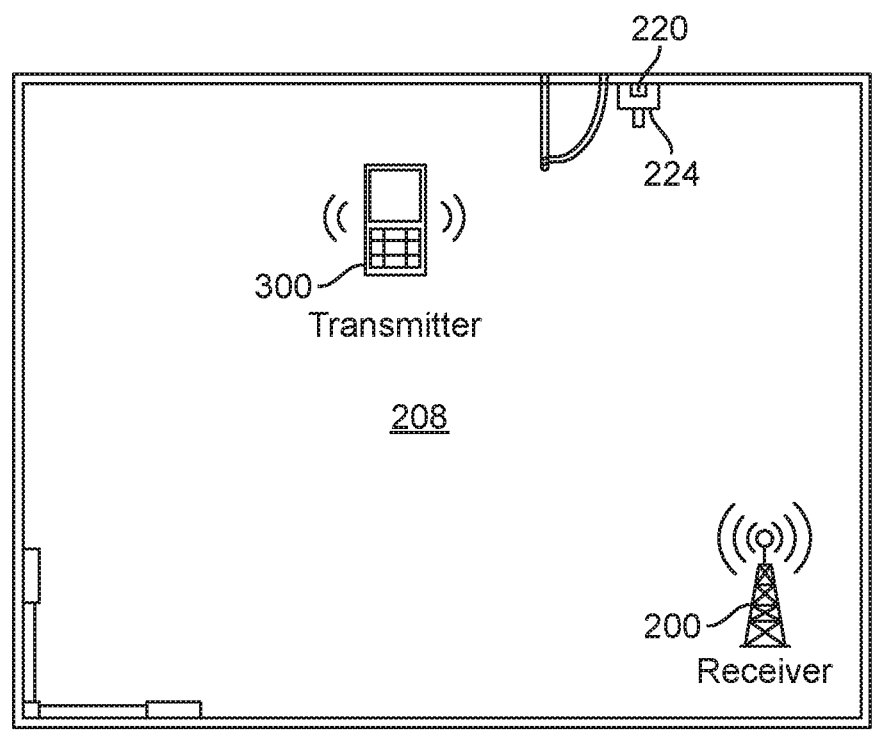
FIG. 3 is a diagram illustrating an example occupancy-detection scenario involving a room and an occupancy-detection system that includes an RF receiver configured to listen for mobile RF transmitters.

FIG. 3 illustrates another scenario in which RF receiver 200 is not matched and tuned to a fixed RF transmitter, such as RF transmitter 204 of FIG. 2, but rather is tuned to one or more frequencies specific to personal devices 300 (e.g., cell phones, smartphones, beepers, etc.) carried by people that may tend to occupy room 208. In such a scenario, methodologies of occupancy-detection method 100 are configured to detect changes in the signal strength caused by RF signals emitted by any personal devices 300 present in room 208.

Referring again to FIG. 1, after receiving the RF signal(s) at step 105, at step 110 the signal strength of the RF signal(s) is sampled, for example, using received signal strength indicator (RSSI). Using the sampled signal strength, occupancy-detection method 100 may update one or more statistical measures of the received RF signal(s) at step 115. Examples of useful statistical measures include the mean and variance of the received RF signal(s). The updating of the statistical measure(s) may be performed in any suitable manner, such as periodically and/or on the samples taken after occupancy-detection method 100 detected the most recent change-point (see step 120) in the received RF signal(s). As described below, occupancy-detection method 100 uses the updated statistical measure(s) in making a determination of occupancy.

At step 120, occupancy-detection method 100 performs a change-point detection analysis on the sampled signal strength to determine whether or not the received RF signal(s) exhibit(s) that a change-point has occurred. As will be readily appreciated, occupancy-detection method 100 performs the change-point detection analysis in a sequential, or online, manner such that the method is continually seeking to recognize change-points in the sampled received RF signal(s). Time-series sequential change-point detection algorithms are well-known in a variety of fields, and those skilled in the art will readily be able to adapt any suitable ones of those algorithms to the time-series nature of the continual sampling of the signal strength of the received RF signal(s). Readers unfamiliar with change-point detection algorithms may refer to any of a variety of publications for detailed discussions of such algorithms. Examples of these publications include Mark Holland et al., "A nonparametric change point model for multivariate phase-II statistical process control," University of Minnesota School of Statistics (May 24, 2011) (http://www.mbswonline.com/upload/presentation_6-2-2011-8-20-36.pdf) and Paul Sharkey, "Nonparametric Methods for Online Changepoint Detection," STOR-I, Lancaster University (May 18, 2014) (http://www.lancaster.ac.uk/pg/sharkeyp/PaulRT2.pdf), each of which is incorporated herein by reference for its teachings of online nonparametric change-point detection. That said, the following is a description of change-point detection in the present context to assist the reader.

Disturbances in an RF signal are caused by a change of the wireless channel between an RF transmitter and an RF receiver. For indoor environments, complex multipath wireless channels are typically expected. This means that the received signal strength does not only depend on the line-of-sight signal, but it also depends on a number of other reflection paths. When a human body or animal body enters a monitored space, the body causes blockage, absorption, reflection, etc., of the RF signals between the RF transmitter and the RF receiver. These effects may happen to the line-of-sight path, and/or reflection paths.

A change-point detection algorithm, such as a change-point detection algorithm performed at step 120 of method 100 of FIG. 1, detects changes of the underlying random process's distribution over time. In particular, the received signal strength at the receiver is considered as a function of time, and can be modeled as a random process. The RSSI values change over time due to environmental changes, which include all moving people, animals, objects, and humidity variations, etc., within a 3D-space that is much larger than the 3-D space of the monitored space itself. For example, people walking 10 meters away from the monitored space may still affect the received signal and its strength. If a human or animal enters the monitored space, however, this creates more significant effects on the received signal strength compared to activities outside of the monitored space. Following this observation, this random process (received signal strength over time) is modeled following two distinct distributions—room occupied and room unoccupied. While the two distributions may have a number of differences, it is not necessary to determine the exact distributions in order to implement a robust occupancy-detection scheme.

This is so because the type of change-point detection algorithm selected is not based on any specific knowledge of any of the two distributions; it is non-parametric. Such a change-point detection algorithm utilizes contrast of the distributions before and after the change-point. In other words, the algorithm is concerned with relative changes in the distribution, not absolute values of the distribution. In some embodiments, the particular contrast looked at is a test statistic based on the concept of "directional rank" (a generalization of the ranking/ordering/permutation in 1-dimensional case). However, occupancy detection systems also have to detect more complicated scenarios than single person tracking. For example, one or more people may enter or exit a room simultaneously or sequentially, or some people may be sitting still in the room while others enter or leave the room. Thus the detection algorithm designed to detect a single change-point of two different distributions should be adapted to detect many different change-points.

To deal with this complex real-world problem, one or more statistical measures, such as the variance and mean, can be calculated for the random process over chunks of time and the results may be analyzed. For instance, the statistical measure(s) may be calculated for every 100 ms of consecutive time slots. Within each 100 ms time slot, there may be, for example, 10 data points. The variance and the mean within that 100 ms time slot can be calculated, and those values can be compared between any two consecutive time slots. If the wireless channel is changing more dramatically, the distribution of the random process should possess a larger valued variance. The mean also plays a role, for example, if a lower value of mean is observed, the explanation is some blockage between the transmitter and receiver. With these observations, the change-point detection algorithm can be applied to detect the change-points among many consecutive events/scenarios. By analyzing variances and means, method 100 can distinguish between the monitored space being occupied and the monitored space not being occupied, as described below.

The algorithm framework of the change-point detection analysis at step 120 can handle multivariate input (multi-dimensional data). As a result, multiple pairs of RF transmitters and receivers may be installed in a monitored space, for example, to help sub-divide the room into zones and perform individual detections of the occupancy of the corresponding zones. A joint-detection can be made based on the individual detection results, and the joint-detection performance may be improved. As another example, instead of sub-dividing the room into zones, the algorithm can also take multivariate input (multi-dimensional data) as a whole and make a joint-detection of the occupancy of the whole room. One or more additional sensors, for example including, but not limited to, carbon dioxide sensors, temperature sensors, and/or air turbulence sensors, can also, or alternatively, be integrated to an occupancy-detection system of the present disclosure for better performance. The change-point detection algorithm can readily be designed to take consideration of multi-dimension/multivariate inputs without knowing what is actually being sensed. Essentially, all that is needed is a contrast that can be correlated to occupancy event changes.

Referring again to FIG. 1, at step 125 occupancy-detection method 100 determines whether or not a change-point has occurred in the sampled signal strength time-series. If not, occupancy-detection method 100 effectively loops back to step 105 via loop 130. That said, those skilled in the art will readily appreciate that what occurs is not necessarily a loop, as that implies a strict sequence to steps of occupancy-detection method 100. Rather, ones of steps 105 through 125 can be performed in a different order and/or simultaneously with one another. For example, steps 115 and 120 can be performed in reverse order or simultaneously with one another. As another example, step 105 can be performed simultaneously with steps 115 and 120, depending on the speed of executing these steps. Loop 130 is generally provided to aid in the presentation of general principles of aspects of occupancy-detection method 100.

If at step 125 occupancy-detection method 100 detects a change-point in the sampled signal strength time-series, the occupancy-detection method proceeds to step 135 at which it assesses the probability that a change in occupancy has occurred. In some embodiments, this assessment may include using the statistical measure(s) updated at step 115, such as by comparing one or more of the statistical measures with stored values corresponding to known or learned occupancy events. At step 140, occupancy-detection method 100 determines whether the probability of a change in occupancy assessed at step 135 is greater than a threshold probability of a change in occupancy occurring. This threshold can be set to any desired value reasonable under the circumstances. For example, the threshold may be set relatively low so that occupancy-detection method 100 errs on the side of conservativeness when the probability assessment algorithms may not yet have the benefit of machine learning (see step 150). Using the lighting-control scenario mentioned above relative to FIG. 2, a relatively low threshold could be relied upon to cause lighting controller 216 to turn luminaires 212 on when the statistical measure(s) is/are relatively inconclusive that a person has just entered room 208. In this case, it may be better to turn luminaires 212 on than not. That said, it may be decided that a higher threshold is desirable. A higher threshold may be desirable, for example, if machine learning (see step 150) is utilized and one or more additional inputs, such as an occupant switching on a light switch in the example of FIG. 2, can be used to confirm that the detected change-point was indeed caused by a change in occupancy.

If at step 140 occupancy-detection method 100 determines that the probability of a change in occupancy is higher than the threshold, the occupancy-detection method issues, at step 145, a change-in-occupancy signal indicating a suspected change in occupancy. This change-in-occupancy signal can take any of a variety of analog or digital forms, depending on the application and configuration of an overall system utilizing occupancy-detection method 100. As a simple example in the context of the lighting-control scenario of FIG. 2, the change-in-occupancy signal may simply be an analog pulse provided to lighting controller 216, which the lighting controller simply takes as an indication to change the state of one or more light switches for turning luminaires 212 off or on. Other devices communicatively coupled to the occupancy detection system may also be turned on or off, such as heating or air conditioning, and security sensors or cameras. As another example using the same scenario, the change-in-occupancy signal may be either of a unique room occupied signal or a unique room unoccupied signal, depending on whether the change in occupancy changed the state of room 208 from unoccupied to occupied, or vice versa. As a more sophisticated example in the context of occupancy-detection method 100 being configured for the ability to detect, or predict, the number of occupants, the change-in-occupancy signal may contain an indication of the number of predicted occupants.

After issuing a change-in-occupancy signal at step 145, occupancy-detection method 100 may proceed to optional step 150 at which the occupancy-detection method may perform machine learning to update the probability assessment process that occurs at step 135. The machine-learning algorithms used at step 150 may be any suitable machine-learning algorithms that can improve the probability assessment that occurs at step 135. Such machine-learning algorithms may be a function of the statistical measure(s) used in the probability assessment process and other input(s) that themselves are known or tend to indicate that a detected change-point and corresponding value(s) of the statistical measure(s) corresponds to an actual chance in occupancy.

As a simple example in the lighting-control scenario of FIG. 2, room 208 may be provided with a sensor 220 that senses when light switch 224 is actuated by someone entering or leaving the room. Occupancy-detection method 100 can use a signal from sensor 220 in the machine learning at step 150 to alter the probability assessment process at step 135 to change the probability determined at that step for another detected change-point having statistical measure(s) the same as or close to the statistical measures corresponding to the occupancy change that resulted in a person having to manually actuate the light switch when occupancy-detection method 100 failed to issue a change-in-occupancy signal at step 145. To illustrate, say that the first time a person enters room 208 (FIG. 2) after occupancy-detection method 100 is started, the occupancy-detection method detects a change-point at step 120, but the probability that the statistical measure(s) correspond to a change in occupancy determined at step 135 are not greater than the threshold at step 140, such that the method does not issue a change-in-occupancy signal at step 145. Consequently, lighting controller 216 does not turn on luminaires 212. As a result, the person entering room 208 manually actuates light switch 224 to turn on luminaires 212, and occupancy-detection method 100 uses the resulting signal from sensor 220 in machine learning at step 150 to cause the probability assessment at step 135 to assign a higher probability for the statistical measure(s) corresponding to the change-point caused by the person actuating the light switch. Then, the next time occupancy-detection method 100 detects a change-point and corresponding statistical measure(s) the same as or close to the statistical measure(s) in which manual actuation of light switch 224 was used, the probability assessment at step 135 will assign a threshold-exceeding probability that causes the occupancy-detection method to issue a change-in-occupancy signal at step 145.

After any machine learning at step 150, occupancy-detection method 100 loops back to step 105, with the caveats noted above relative to loop 130. If step 150 is not present, occupancy-detection method 100 simply loops back to step 105 after step 145. If at step 140 occupancy-detection method 100 determines at step 140 that the probability from step 135 does not exceed the threshold, the occupancy-detection method may proceed to optional step 150, if present, or, if not, to step 105, again with the caveats noted above relative to loop 130. Those skilled in the art will readily understand that occupancy-detection method 100 is merely example and that various changes, including removal of certain steps, additions of other steps, reordering of steps, and/or replacement of steps, can be made to accommodate a particular application while still falling within overarching principles of the various embodiments.

One example of the change-in-occupancy probability assessment algorithm is the following: one may compute the mean values of the RSSI signal over the two consecutive time slots before and after the detected change-point, respectively. One may then compute the difference of the two mean values, based on the obtained difference in value, one may assign an appropriate function to map the difference in value into a probability value of the room becoming occupied or unoccupied. As another example, one may compute the variance values of the RSSI signal over the two consecutive time slots before and after the detected change-point, respectively. One may then compute the difference of the two variance values, based on the obtained difference in value, one may assign an appropriate function to map the difference in value into a probability value of the room becoming occupied or unoccupied. As another example, one may combine the above two examples and assign an appropriate function to map the differences of the mean and the variance into a probability value as a whole. The choices of functions (probability measures) mentioned above can be flexible to accommodate various scenarios. The choices of the functions can also be determined dynamically by appropriate machine-learning algorithms. In addition, higher moments of the random signal could be also used for the detection algorithm.

One example of a potential suitable machine-learning algorithm is Q-learning. Q-learning is a temporal difference reinforcement learning method. In Q-learning and related algorithms, an agent tries to learn the optimal policy from its history of interaction with the environment. (See, e.g., R. S. Sutton and A. G. Barto, Reinforcement Learning: An Introduction, MIT Press, 1998, which is incorporated herein by reference for its teachings on reinforcement learning techniques.) This may include deciding actions (judgment of the occupancy of the space, and/or turning the lights on and/or off based on the judgment) based on a predefined probability distribution depending on the current situation and observe the outcomes of the actions. The outcomes of the actions may be differentiated into two different categories: reward and punishment. In a case, if the algorithm decides to turn the lights off for a space, and no occupants would turn the lights back on with a manual switch within a short period of time, this may be considered/modeled as a form of reward to the action in the state/situation of the system when the algorithm decided to turn the lights off. In another case, if the algorithm decides to turn the lights off, and the lights are turned back on, this may be considered as a form of punishment to the action in the state/situation of the system when the algorithm decided to turn the lights off. Based on the observed rewards and punishments, the algorithm would adjust the aforementioned probability distribution (reducing the uncertainties of actions under certain states) as well as some other parameters (e.g. threshold values) of the system accordingly in order to maximize the rewards of future actions. The initial probability distribution of actions is adopted to ensure the system would be exposed to a variety of combinations of system state, action taken, and corresponding outcomes.

Figure 4:
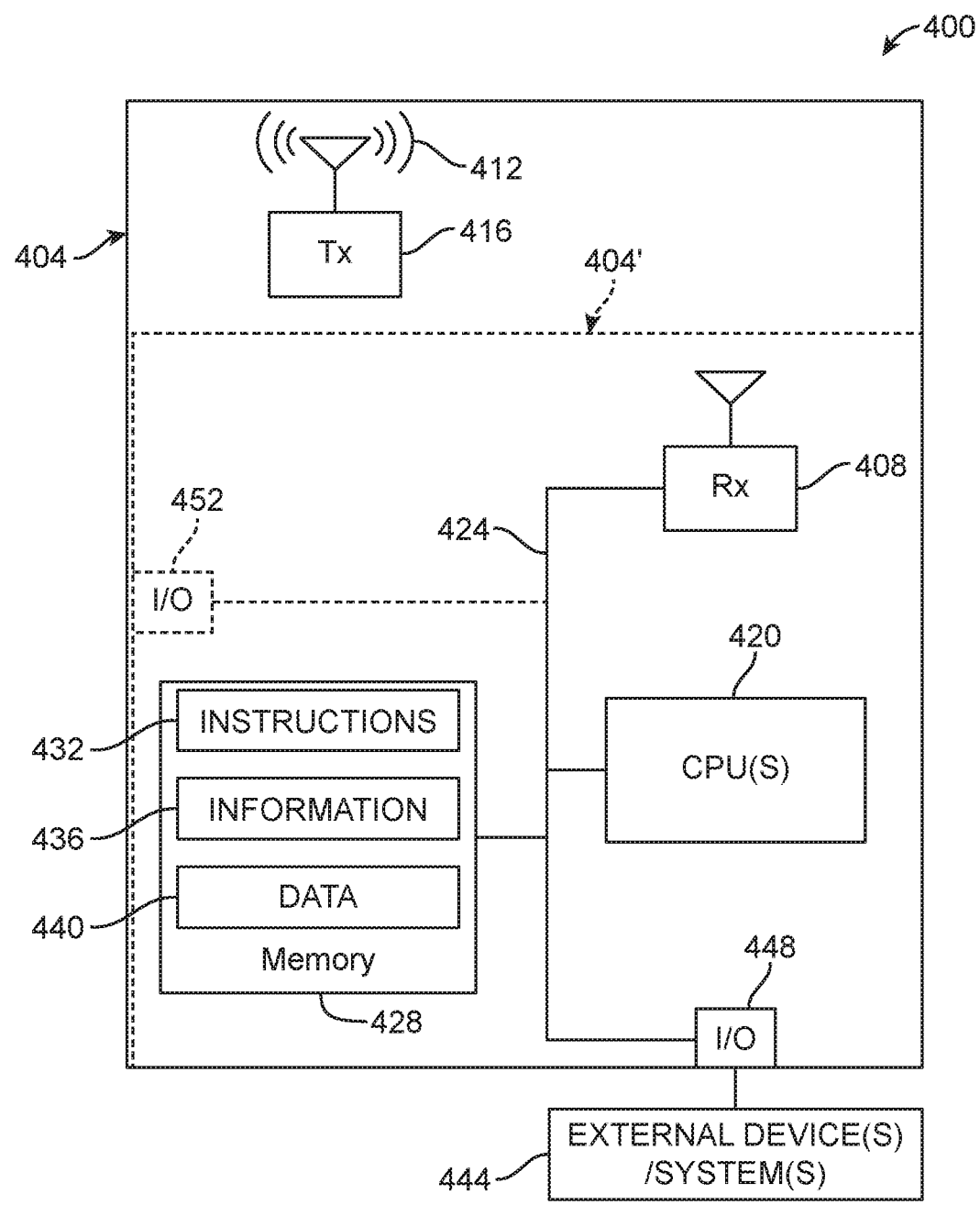
FIG. 4 is a high-level block diagram of an example occupancy-detection system made in accordance with various embodiments.

FIG. 4 illustrates an example overall system 400 that includes an RF-based occupancy-detection system 404, 404' that is designed and configured to execute an occupancy-detection method of the present disclosure, such as the occupancy-detection method 100 of FIG. 1 that utilizes online change-point detection to trigger a change-in-occupancy assessment. In this example, occupancy-detection system 404, 404' includes one or more RF receivers, here a single RF receiver 408, tuned to receive one or more RF signals 412 transmitted by one or more RF transmitters, here a single RF transmitter 416 for the sake of simple explanation, each of which may or may not be provided solely as part of the occupancy-detection system. In FIG. 4, occupancy-detection system 404 shows RF transmitter 416 as being part of the occupancy-detection system, such as when the RF transmitter 416 is fixed relative to the monitored space (not shown) and provided in combination with RF receiver 408. In contrast, occupancy-detection system 404' shows RF transmitter 416 as not being part of the occupancy-detection system, such as when RF receiver 408 is provided separately from RF transmitter 416. For example, the RF transmitter 416 may be aboard a mobile device carried by an occupant of the monitored space, or the RF transmitter 416 may be present before deployment of the occupancy detection system, for example a wireless router or one or more wireless sensor nodes already present in or proximate to the monitored space. As mentioned above relative to occupancy-detection method 100 of FIG. 1, RF transmitter 416 may be any suitable RF transmitter, such as an RF transmitter of a WI-FI® router, a wireless sensor network node, a cell phone, a smartphone, or a device dedicated to occupancy-detection system 404, among others. Fundamentally, there is no limitation on RF transmitter 416 other than it transmit one or more RF signals that permit occupancy-detection in accordance with the general principles described herein. Correspondingly, RF receiver 408 may be any RF receiver capable of receiving at least one of RF signal(s) 412.

Occupancy-detection system 404, 404' also includes a central processing unit (CPU) 420 designed and configured to process machine-executable instructions that provide the occupancy-detection system with its various functionalities, including the functionalities described herein. CPU 420 may comprise a general processor (e.g., a processor aboard a desktop computer, a laptop computer, a tablet computer, etc.) or be part of an embedded system, an application specific integrated circuit, or system-on-chip, among other things. It is noted that in other embodiments, CPU 420 may be replaced with a plurality of processing units, which may or may not be distributed among an external network. RF receiver 408 is in operative communication with CPU 420 via suitable means, such as a communications bus 424.

Occupancy-detection system 404, 404' further includes memory 428 operatively connected to CPU 420 to allow the CPU 420 to, among other things, retrieve instructions and data contained in the memory and to allow the CPU 420 to store data in the memory. For convenience, memory 428 can represent the totality of the memory utilized by occupancy-detection system 404, 404', including non-volatile and volatile physical memory onboard CPU 420, local to the CPU, and/or available over any suitable network. For example, the memory 428 may include one or more of random access memory (RAM), read only memory (ROM), FLASH memory, and processor caches. Fundamentally, there is no limitation of the nature and location of memory 428.

In this example, memory 428 contains all of the machine-executable instructions to operate occupancy-detection system 404, 404', as well as other machine-executable instructions that may implement other functions not specifically addressed herein, such as providing one or more user interfaces (not shown) that may allow a user to initialize, configure, and adjust the occupancy-detection system 404, 404' to provide any non-occupancy-detection functionality that CPU 420 may also provide. For example, memory 428 contains machine-executable instructions 432 for causing occupancy-detection system 404, 404' to perform an occupancy-detection method of the present disclosure, such as change-point-detection-based occupancy-detection method 100 of FIG. 1. Skilled artisans will readily understand that machine-executable instructions 432 contain, among other things, machine executable instructions for performing the algorithms of an occupancy-detection method, such as, for example, an online change-point detection algorithms (e.g., an online change-point detection algorithm performed at step 120 of FIG. 1), a change-in-occupancy assessment algorithm (e.g., a change-in-occupancy assessment algorithm performed at step 135 of FIG. 1), and, optionally, a machine-learning algorithm (e.g., a machine-learning algorithm performed at step 150 of FIG. 1), among others. It is noted that the singular term "algorithm" includes multiple algorithms, which may be present as sub-algorithms. Those skilled in the art will readily understand how to code machine-executable instructions 432 using the present disclosure as a guide and using programming techniques known in the art.

Memory 428 also contains information 436 utilized by occupancy-detection system 404, 404' to properly execute machine-executable instructions 432 and provide the occupancy-detection functionalities encoded therein. Examples of items contained in information 436 include, but are not limited to, any parameters for the online change-point detection algorithm, any parameters for the change-point-assessment algorithm, comparative data (e.g., historical or learned) used for the change-point-assessment algorithm (such as used in connection with step 140 of FIG. 1), any parameters for the machine-learning algorithm, and any parameters and/or other information used in connection with step 145 of FIG. 1, among other items. Memory 428 may also include data 440 generated at any step of the occupancy-detection method executed by occupancy-detection system 404, 404', among other data (not shown).

In this example, occupancy-detection system 404, 404' is used to control and/or otherwise communicate with one or more external devices and/or external systems (represented collectively and separately at element 444 in FIG. 4). Examples of devices and systems that occupancy-detection system 404, 404' can be used to control and/or otherwise communicate with include, but are not limited to, a luminaire or system of luminaires, an HVAC device (e.g., thermostat/controller) or HVAC system, a burglary alarm or alarm system, a building management system or other database that records events, a feedback system for people in the monitored space, and any logical combination thereof, among others. Fundamentally, there is no limitation on the type(s) of devices and/or systems that occupancy-detection system 404, 404' may control. To communicate with device(s) and/or system(s) 444, occupancy-detection system 404, 404' may include an input/output (I/O) device 448, which may be any suitable I/O device, such as a wired or wireless port.

As described above in connection with FIG. 1, occupancy-detection method 100 can optionally include machine learning (see step 150) that takes as input information collected from one or more external sources. In the example noted above, the additional information may be a signal that light switch 224 has been actuated. Examples of other non-RF-transmitter external devices that can be used for machine learning and can communicate information to occupancy-detection system 404, 404' include motion sensors, door-activated switches, thermal sensors, $CO_2$ sensors, VOC sensors, aural sensors, relative humidity sensors, differential pressure sensors, airflow sensors, capacitive sensors, and trip sensors, among others. To receive such signals and/or other signal(s) for machine learning, occupancy-detection system 404, 404' may include one or more additional I/O devices 452, each of which may be any suitable wired or wireless port device. It is noted that occupancy-detection system 404' can be deployed, for example, as each of occupancy-detection systems 508 (FIG. 5A) and 604 (FIGS. 6A, 7A, and 8A) described below in the context of some example occupancy-detection scenarios.

FIGS. 5A to 8B illustrate four example occupancy-detection scenarios 500, 600, 700, and 800. In these figures, the following notations are used: "Rx(i)" denotes the $i^{th}$ RF receiver; "Tx(i)" denotes the $i^{th}$ RF transmitter; and "RSSI (i,j)" denotes received RSSI values of the RF signal from the $j^{th}$ RF transmitter at the $i^{th}$ RF receiver.

Figure 5A:
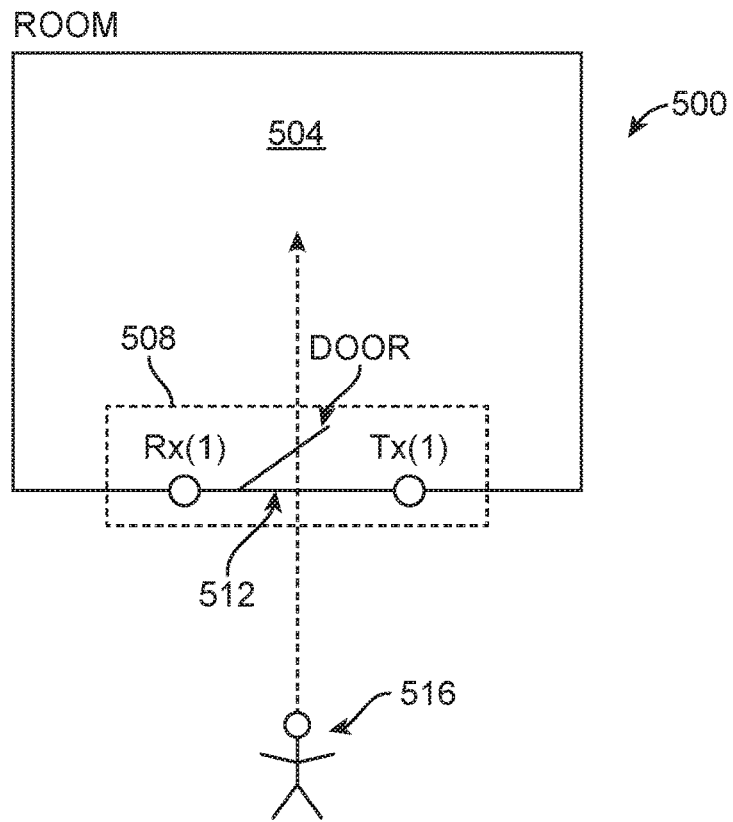
FIG. 5A is a diagram illustrating an occupancy-detection scenario in which a person enters a room, wherein the room has deployed therein a single fixed RF receiver and a single fixed RF transmitter of an occupancy-detection system of the present disclosure.

Turning now to FIG. 5A, this figure illustrates occupancy-detection scenario 500 in which a room 504 is the monitored space being monitored by an occupancy-detection system 508 of the present disclosure. A doorway 512 provides the sole access to room 504, and occupancy-detection system 508 utilizes a single Tx(1) and a matched single Rx(1) located on either side of the doorway. By "matched" it is meant that Tx(1) transmits at a certain RF frequency and Rx(1) is tuned to receive signals at that RF frequency. It is noted that other components of occupancy-detection system 508 are not shown for the sake of simplicity, but such components may be the same as or similar to like components of other occupancy-detection systems described herein, such as occupancy-detection system 404' of FIG. 4. In occupancy-detection scenario 500, a single person 516 enters room 504 via doorway 512.

Figure 5B:
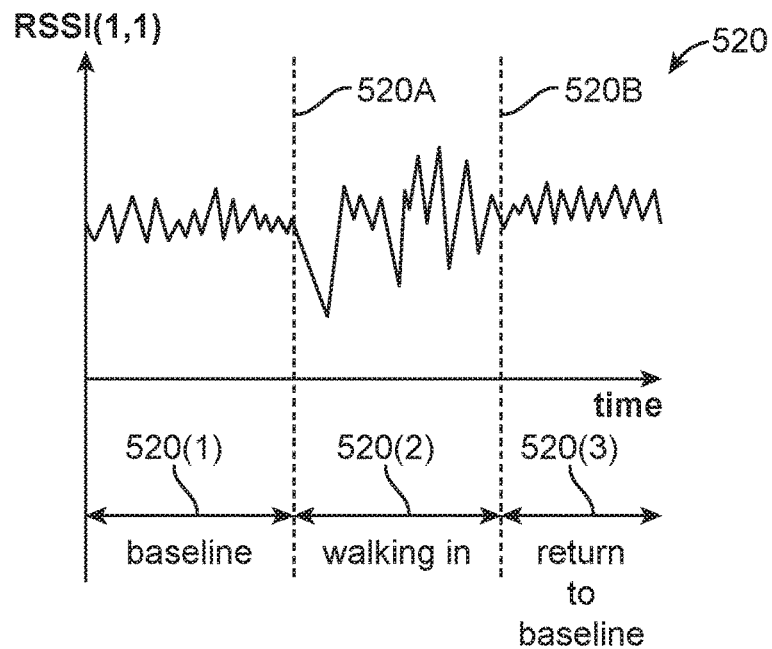
FIG. 5B is a graph for the occupancy-detection scenario of FIG. 5A illustrating detected change-points in radio signal strength indicator (RSSI) data and corresponding occupancy status and received signal information.

FIG. 5B includes a time-series plot 520 of RSSI values RSSI(1,1) of the signal received by Rx(1) from a time prior to person 516 (FIG. 5A) entering room 504 to a time after the person has passed through doorway 512 and has proceeded farther into the room. As seen in time-series plot 520 (FIG. 5B), prior to person 516 walking into room 504, RSSI values RSSI(1,1) of received signal has a baseline character, as indicated in time-period 520(1) of the time-series plot. This baseline character is due at least in part to the RF signal transmitted by Tx(1) and perhaps also any background signal(s) that may be on the same frequency as Rx(1). Examples of background signals that can contribute to the baseline character of the RF signal received by Rx(1) in time-period 520(1) include, but are not limited to signals from other RF transmitters (not shown) that may be in room 504 or the same building as the room, devices in the room or building that cause noise on the received signal, and RF transmitters and/or noisy devices that may be operating outside of the building that room 504 is in, among others. As can be seen, in this example, RSSI values RSSI(1,1) of the baseline signal in time-period 520(1) has a relatively small variance about a constant value.

When person 516 enters room 504 through doorway 512 and as seen in time-period 520(2) of time-series plot 520 of FIG. 5B, the presence of that person between Tx(1) and Rx(1) impacts the RF signal that Rx(1) receives, in this case, causing RSSI values RSSI(1,1) of the signal to have a larger variance. After person 516 passes out from in-between Tx(1) and Rx(1) (e.g., exits the room 504 or moves out or range of Rx(1) and Tx(1)), RSSI values RSSI(1,1) of the signal the Rx(1) receives returns back to the baseline character present in time-period 520(1), as illustrated in time-period 520(3) in FIG. 5B. The nature of the frequency chosen for Tx(1) and Rx(1) and the character of room 504 may result in changes to RSSI values RSSI(1,1) of the received signal when a person, such as person 516 passes between Tx(1) and Rx(1).

Occupancy-detection system 508 in occupancy-detection scenario 500 may implement a suitable occupancy-detection method, such as occupancy-detection method 100 of FIG. 1 to determine the relevant change-points, here change-points 520A and 520B, in RSSI values RSSI(1,1) of the received signal. Such occupancy-detection method may also, for example, determine the relevant statistical measure(s) of RSSI values RSSI(1,1) of the received signal, compare the statistical measure(s) to stored values known to correspond to occupancy events, such as a person entering room 504 and leaving the room 504, and/or use other analytics to determine whether or not the room 504 remains occupied, among other things.

Figure 6A:
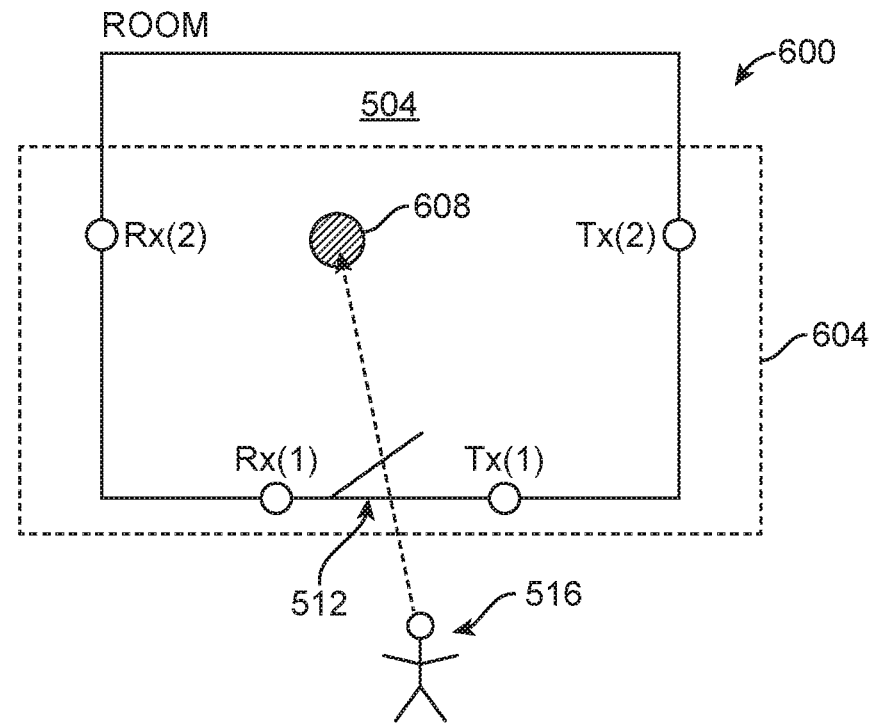
FIG. 6A is a diagram illustrating an occupancy-detection scenario in which a person enters a room and stays in the room at a fixed location, wherein the room has deployed therein two fixed RF receivers and two fixed RF transmitters of an occupancy-detection system of the present disclosure.

FIG. 6A illustrates an occupancy-detection scenario 600 that involves the same room 504, Tx(1), and Rx(1) of occupancy-detection scenario 500 of FIG. 5A but adds a second RF transmitter, Tx(2), and a matched second RF receiver, Rx(2), to form an occupancy-detection system 604 that is more robust than occupancy-detection system 508 of FIG. 5A. As noted above, Tx(1) and Rx(1) are tuned to a frequency for which the signal received by the Rx(1) is largely affected by the presence of a person, such as person 516, located between Tx(1) and Rx(1), such that when the person is in room 504 but moves to a location away from Tx(1) and Rx(1), for example, location 608, that person is no longer affecting the signal received at Rx(1), and occupancy-detection system 604 may not know whether or not the person has just entered the room or has just left the room. Adding Tx(2) and Rx(2) in this example solves this issue.

Figure 6B:
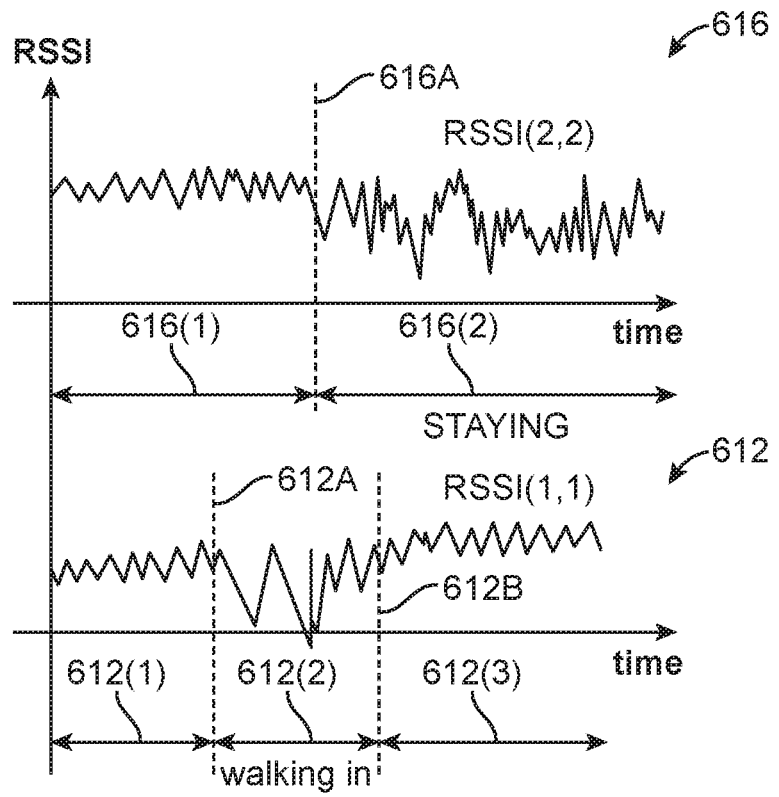
FIG. 6B is a graph for the occupancy-detection scenario of FIG. 6A illustrating detected change-points in RSSI data and corresponding occupancy status.

In occupancy-detection scenario 600, Tx(2) and matching Rx(2) are located on opposite sides of room 504 and away from Tx(1) and Rx(1). Like Tx(1) and Rx(1), the nature of the frequency selected for Tx(2) and Rx(2) may be such that the signal received at Rx(2) is largely significantly disturbed by the presence of a person, such as person 516, between Tx(2) and Rx(2). FIG. 6B shows two time-series plots, one time-series plot 612 containing RSSI values RSSI(1,1) of the signal that Rx(1) receives and another time-series plot 616 containing RSSI values RSSI(2,2) of the signal that Rx(2) receives during occupancy-detection scenario 600.

As seen in FIG. 6B, time-series plot 612 is similar to time-series plot 520 of FIG. 5B in that it has a time-period 612(1) during which a baseline character of RSSI values RSSI(1,1) is seen, a time-period 612(2) during which a person 516 is entering room 504 through doorway 512 and between Tx(1) and Rx(1), and a time period 612(3) during which the person 516 has moved out of range of Tx(1) and Tx(1) and the RSSI values RSSI(1,1) return to the baseline character. As noted above, because RSSI values RSSI(1,1) return to their baseline character in time-period 612(3), the occupancy-detection system does not know whether person 516 is in room 504 or whether the person immediately left the room after disturbing the signal received at Rx(1). However, the presence of Tx(2) and Rx(2) solves this issue as shown in time-series plot 616 of FIG. 6B.

As seen in time-series plot 616, before person 516 reaches or gets close to location 608 (FIG. 6A), RSSI values RSSI(2,2) have a baseline character in time-period 616(1). However, when person 516 gets close to and reaches location 608, the person's presence there perturbs the signal RF receiver Rx(2) receives. The corresponding RSSI values RSSI(2,2), in time-period 616(2) are also perturbed, resulting in a change-point 616A that occupancy-detection system 604 can detect, such as by using occupancy-detection method 100, above. As can be seen in plot 616, both the mean and variance of RSSI values RSSI(2,2) change in time-period 616(2) from their respective values in time-period 616(1), and the occupancy detection system can use one or both of these statistical values to determine the probability of occupancy of room 504. Occupancy-detection system 604 can perform, for example, method 100 of FIG. 1 so as to also determine change-points 612A and 612B of time-series plot 612, and change point 616A of time-series plot 612, among other things.

Figure 7A:
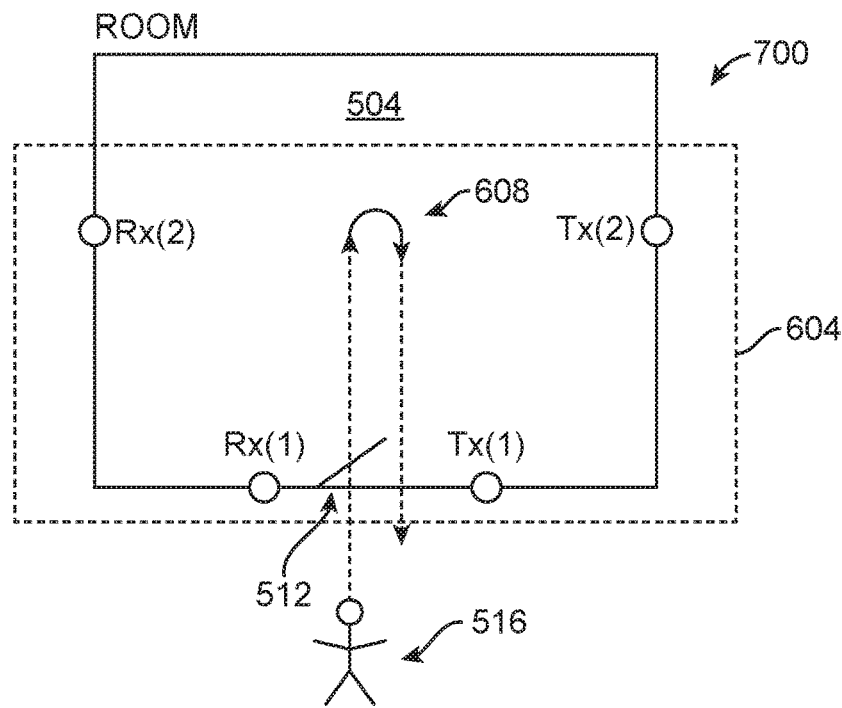
FIG. 7A is a diagram illustrating an occupancy-detection scenario in which a person enters and then leaves a room, wherein the room has deployed therein two fixed RF receivers and two fixed RF transmitters of an occupancy-detection system of the present disclosure.

FIG. 7A illustrates another scenario 700 involving room 504 and occupancy-detection system 604 of FIG. 6A. In scenario 700, person 516 enters room 504 via doorway 512 between Tx(1) and Rx(1), walks into the room to location 608 between Tx(2) and Rx(2), and the turns around and exits the room via doorway 512.

Figure 7B:
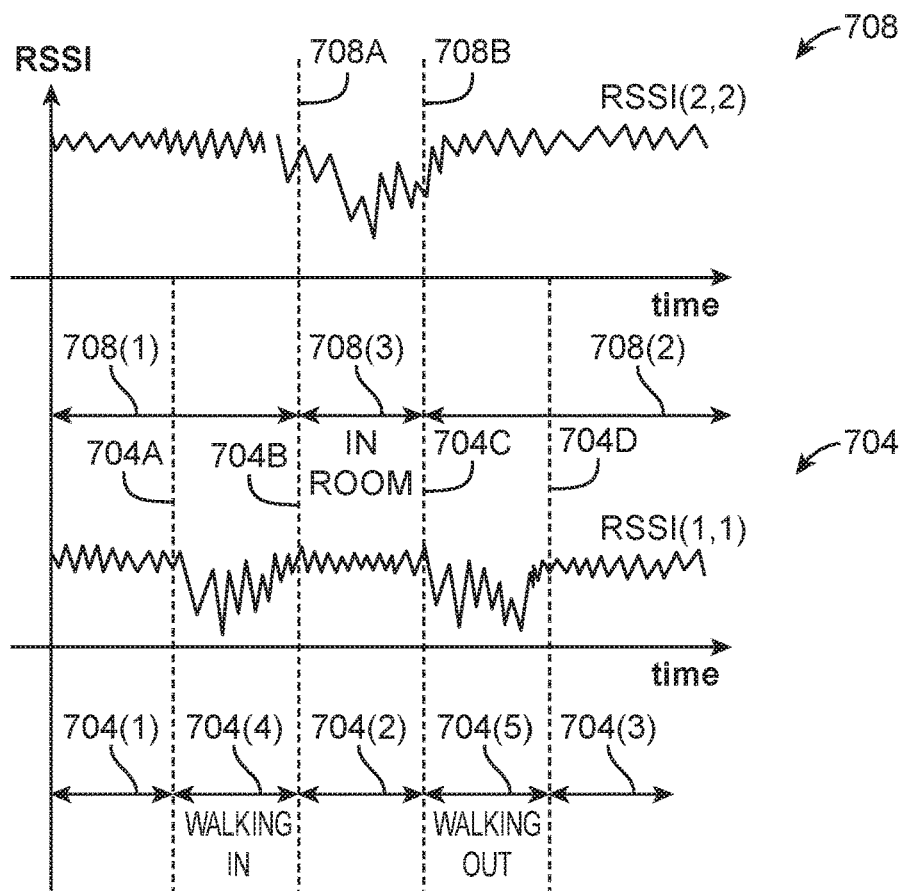
FIG. 7B is a graph for the occupancy-detection scenario of FIG. 7A illustrating detected change-points in RSSI data and corresponding occupancy status.

FIG. 7B shows time-series plots 704 and 708 containing, respectively, RSSI values RSSI(1,1) and RSSI(2,2) of the signals received by corresponding Rx(1) and Rx(2) during occupancy-detection scenario 700 of FIG. 7A. As seen in time-series plot 704, RSSI values RSSI(1,1) have a baseline character in time-periods 704(1), 704(2), and 704(3) when person 516 is not passing between Tx(1) and Rx(1) and have a perturbed character in time-periods 704(4) and 704(5) when the person passes between Tx(1) and Rx(1) so as to perturb the signal passing from Tx(1) to Rx(1). As seen in time-series plot 708, RSSI values RSSI(2,2) have a baseline character in time-periods 708(1) and 708(2) when person 516 is not close to or at location 608 between Tx(2) and Rx(2) and have a perturbed character in time-period 708(3) when the person is near and at location 608 between Tx(2) and Rx(2) so as to perturb the signal passing from Tx(2) to Rx(2). Occupancy-detection system 604 can perform, for example, method 100 of FIG. 1 so as to determine change-points 704A, 704B, 704C, 704D, 708A, and 708B, among others, determine pertinent statistical measures of RSSI values RSSI(1,1) and RSSI(2,2), and determine probabilities of occupancy based on such statistical measures, as described above.

Figure 8A:
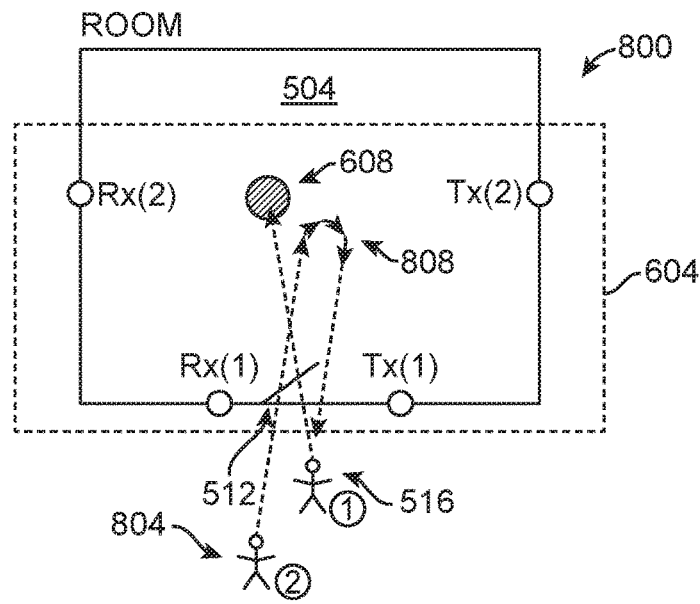
FIG. 8A is a diagram illustrating an occupancy-detection scenario in which a first person enters and stays and a second person then walks into the room and then walks out of the room, wherein the room has deployed therein two fixed RF receivers and two fixed RF transmitters of an occupancy-detection system of the present disclosure.

FIG. 8A illustrates an occupancy-detection scenario 800 involving room 504 and occupancy detection system 604 of FIGS. 6A and 7A. Occupancy-detection scenario 800 is essentially a combination of occupancy-detection scenarios 600 and 700 of FIGS. 6A and 7A, respectively, but with two different people 516 and 804 performing their respective actions at about the same time. In occupancy-detection scenario 800 of FIG. 8A, person 516 enters room 504 via doorway 512 and proceeds to, and stays at, location 608, while person 804 enters the room via the doorway and proceeds to a location 808 proximate to location 608 where person 516 is staying and then turns around and leaves the room via doorway 512.

Figure 8B:
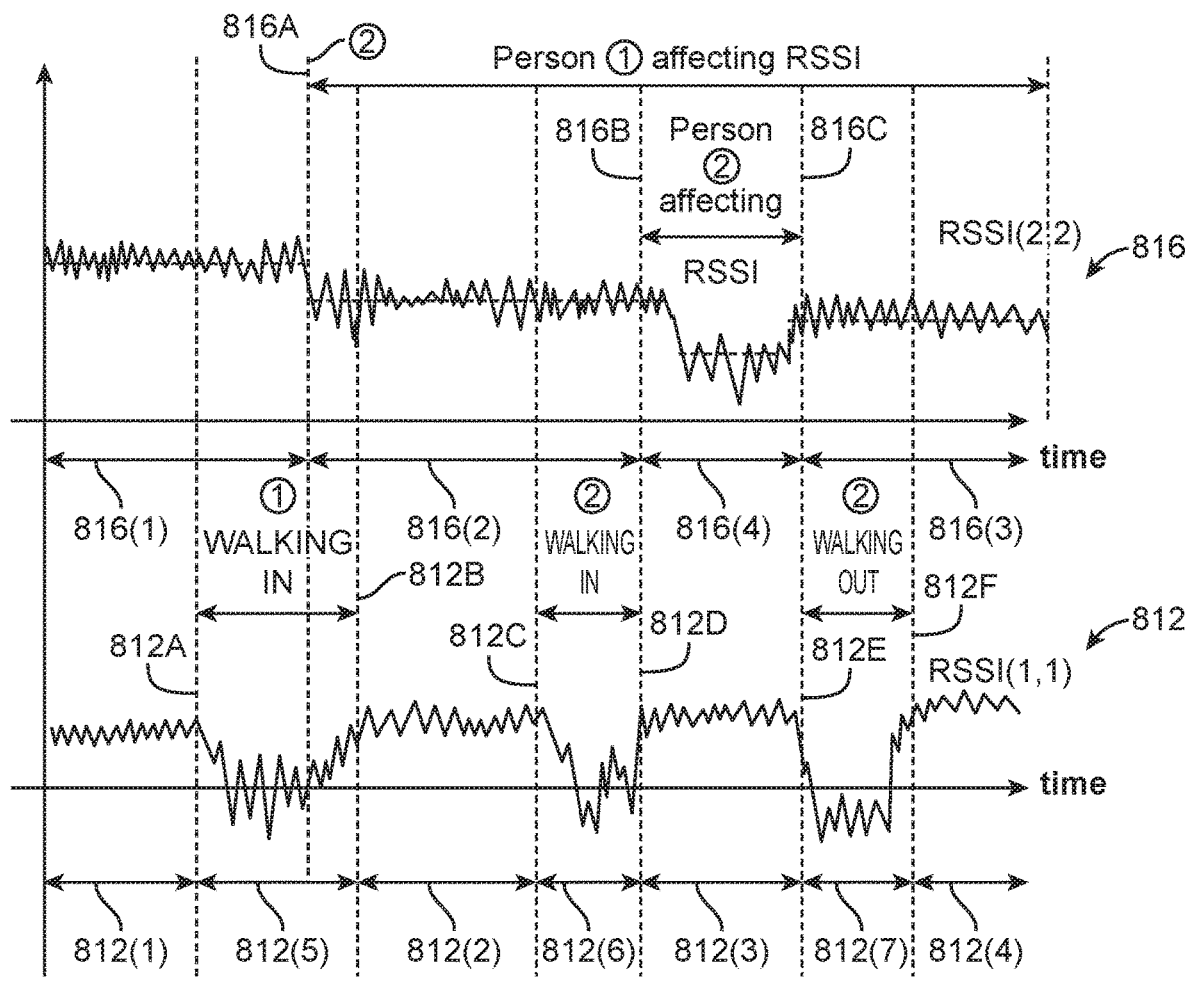
FIG. 8B is a graph for the occupancy-detection scenario of FIG. 8A illustrating detected change-points in RSSI data and corresponding occupancy status.

FIG. 8B shows time-series plots 812 and 816 containing, respectively, RSSI values RSSI(1,1) and RSSI(2,2) of the signals received by corresponding RF receivers Rx(1) and Rx(2) during occupancy-detection scenario 800 of FIG. 8A. As seen in time-series plot 812, RSSI values RSSI(1,1) have a baseline character in time-periods 812(1), 812(2), 812(3), and 812(4) when neither of people 516 and 804 are passing between Tx(1) and Rx(1) and have a perturbed character in time-periods 812(5), 812(6), and 812(7) when either of the two people passes between Tx(1) and Rx(1) so as to perturb the signal passing from Tx(1) to Rx(1). As seen in time-series plot 816, RSSI values RSSI(2,2) have a baseline character in time-period 816(1) when neither person 516, 804 is close to or at location 608 between Tx(2) and Rx(2), have a first perturbed character in time-periods 816(2) and 816(3) when person 516 is near and at location 608 between Tx(2) and Rx(2) so as to perturb the signal passing from Tx(2) to Rx(2), and have a second perturbed character in time-period 816(4) when person 516 is near and at location 608 and person 804 is nearby, at location 808, both between Tx(2) and Rx(2) so that both peoples are perturbing the signal passing from Tx(2) to Rx(2). Occupancy-detection system 604 can perform, for example, method 100 of FIG. 1 so as to determine change-points 812A to 812F and 816A to 816C, among others, determine pertinent statistical measures of RSSI values RSSI(1,1) and RSSI(2,2) during time-periods 812(1) to 812(7) and 816(1) to 816(4), and determine probabilities of occupancy based on such statistical measures, as described above.

Those skilled in the art will readily appreciate that the foregoing occupancy-detection scenarios 500, 600, 700, and 800 are merely examples and that many other scenarios exist. However, using the fundamental teachings of the present disclosure, skilled artisans will be able to devise methods and systems for determining occupancy for those scenarios.

Example Computer System

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instructions, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a smartwatch or other wearable computing device, a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
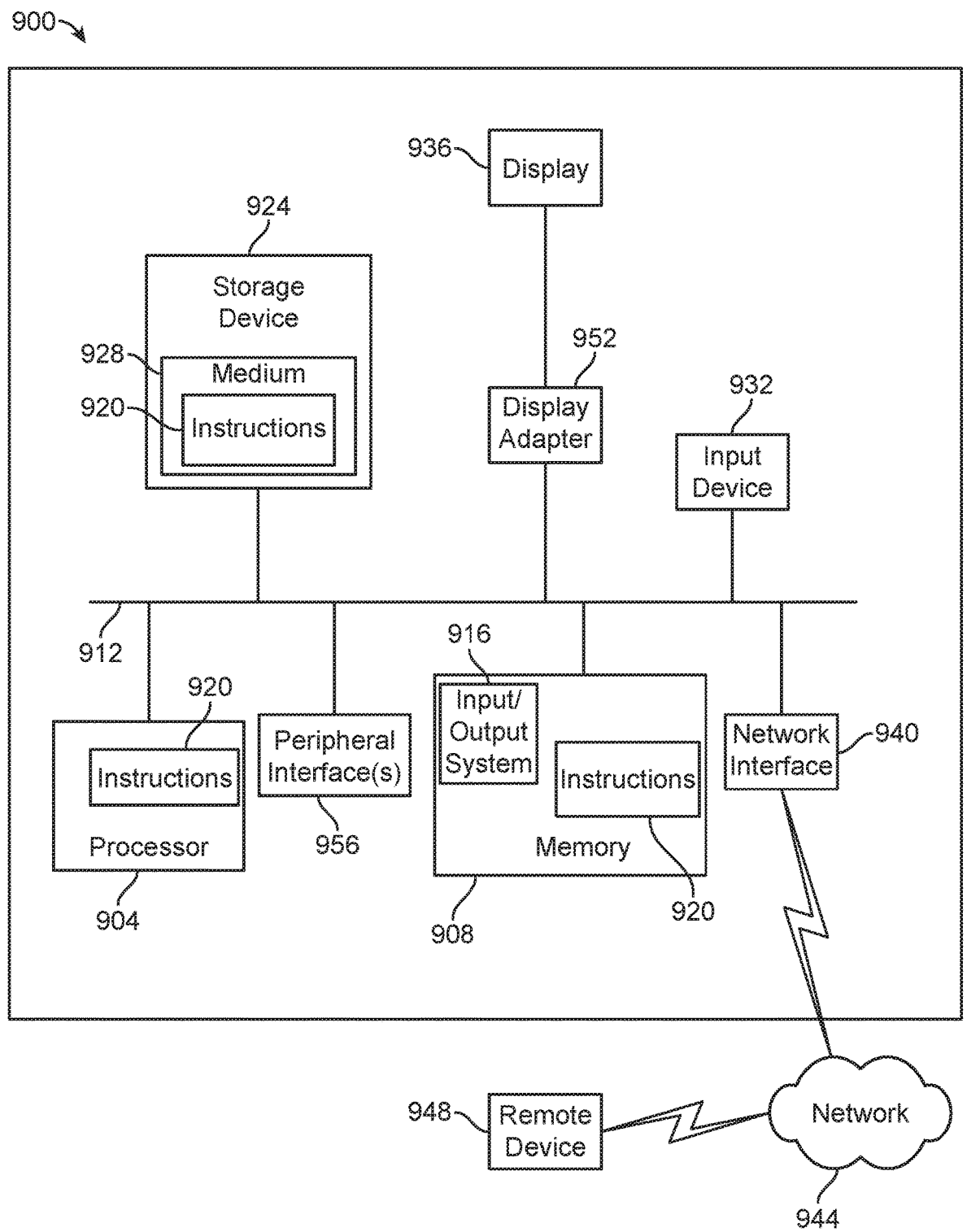
FIG. 9 is a high-level block diagram of a computing system that can be used in any one or more roles within an occupancy-detection system of the present disclosure.

FIG. 9 shows a diagrammatic representation of one embodiment of a computing device in the example form of a computer system 900 within which a set of instructions may be executed for causing a system, such as any one or more of occupancy-detection systems 404, 404', 508, and 604 and/or portion(s) and/or combinations thereof, of FIGS. 4, 5A, 6A, 7A, and 8A, to perform any one or more of the aspects and/or methodologies of the present disclosure, such as occupancy-detection method 100 of FIG. 1. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Memory 908 may include various components (e.g., machine-readable media) including, but not limited to, a random access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software instructions 920 may reside, completely or partially, within machine-readable medium 928. In another example, software instructions 920 may reside, completely or partially, within processor 904.

Computer system 900 may also include one or more input devices 932. In one example, a user of computer system 900 may enter commands and/or other information into computer system 900 via input devices 932. Examples of input devices 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input devices 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input devices 932 may include a touch screen interface that may be a part of or separate from display 936, discussed further below. Input devices 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of various illustrative embodiments. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this application. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the various embodiments. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this application.

Example embodiments have been disclosed above and illustrated in the accompanying drawings. It will be understood by those skilled in the art that various changes, omissions and additions may be made to that which is specifically disclosed herein without departing from the spirit and scope of the present application.

What is claimed is:

1. A method for occupancy detection, comprising:
   receiving radio frequency (RF) energy within a monitored space generated by at least two RF transmitter/receiver pairs, wherein:
   each RF transmitter/receiver pair comprises:
   a RF transmitter in a first fixed location within the monitored space that transmits a RF signal at a specified frequency; and
   a RF receiver in a second fixed location within the monitored space configured to receive RF signals at the specified frequency; and
   each RF transmitter/receiver pair has a different specified frequency;
   generating a time-series RF signal based on the RF energy received;
   performing a nonparametric online change-point detection algorithm on the time-series RF signal to detect a change-point in the RF signal;
   determining whether or not a change in occupancy of the monitored space has occurred based on the change-point; and
   outputting a change-in-occupancy signal in response to determining that a change in occupancy of the monitored space has occurred.

2. The method according to claim 1, wherein determining whether or not a change in occupancy of the monitored space has occurred based on the change-point comprises:
   determining a statistical measure of the time-series RF signal; and
   comparing the statistical measure to a threshold, wherein the threshold is based stored statistical data.

3. The method according to claim 1, further comprising implementing a machine learning algorithm to improve the correlation of the change-point to an occupancy event.

4. The method according to claim 3, wherein the machine learning algorithm uses sensor data from at least one sensor deployed to sense a change within the monitored space.

5. The method according to claim 4, wherein the at least one sensor comprises at least one of a motion sensor, a door-activated switch, a light-switch sensor, a thermal sensor, a $CO_2$ sensor, a VOC sensor, an aural sensor, a relative humidity sensor, a differential pressure sensor; an airflow sensor, a capacitive sensor, and a trip sensor.

6. The method according to claim 3, wherein the machine learning algorithm uses RF energy emitted by a personal device carried by a person to sense a change within the monitored space.

7. The method according to claim 1, further comprising:
outputting the change-in-occupancy signal as input to a system; and
controlling one or more devices within the system as a function of the change-in-occupancy signal.

8. The method of claim 7, wherein the one or more devices comprise at least one of a HVAC device, a lighting device, and a security system device.

9. The method according to claim 7, wherein the system includes a database that records events and the change-in-occupancy signal prompts the system to record an event in the database.

10. A non-transitory machine-readable storage medium containing machine-readable instructions configured to cause a processor of an occupancy detection system to perform operations comprising:
receiving radio frequency (RF) energy within a monitored space generated by at least two RF transmitter/receiver pairs, wherein:
each RF transmitter/receiver pair comprises:
a RF transmitter in a first fixed location within the monitored space that transmits a RF signal at a specified frequency; and
a RF receiver in a second fixed location within the monitored space configured to receive RF signals at the specified frequency; and
each RF transmitter/receiver pair has a different specified frequency;
generating a time-series RF signal based on the RF energy;
performing a nonparametric online change-point detection algorithm on the time-series RF signal to detect a change-point in the RF signal;
determining whether or not a change in occupancy of the monitored space has occurred based on the change-point; and
generating a change-in-occupancy signal in response to determining that a change in occupancy of the monitored space has occurred.

11. The non-transitory machine-readable storage medium according to claim 10, wherein the stored processor-executable instructions are further configured such that determining whether or not a change in occupancy of the monitored space has occurred based on the change-point comprises:
determining a statistical measure of the time-series RF signal; and
comparing the statistical measure to a threshold, wherein the threshold is based stored statistical data.

12. The non-transitory machine-readable storage medium according to claim 10, wherein the stored processor-executable instructions are further configured to cause the processor to perform operations comprising implementing a machine learning algorithm to improve the correlation of the change-point to an occupancy event.

13. The non-transitory machine-readable storage medium according to claim 12, wherein the machine learning algorithm uses at least one of sensor data from at least one sensor and RF energy emitted by a personal device carried by a person to sense a change within the monitored space.

14. The non-transitory machine-readable storage medium according to claim 10, wherein the stored processor-executable instructions are further configured to cause the processor to perform operations comprising:
outputting the change-in-occupancy signal as input to a system; and
controlling one or more devices within the system as a function of the change-in-occupancy signal.

15. A system comprising:
at least two RF transmitter/receiver pairs within a monitored space and configured to generate RF energy, wherein:
each RF transmitter/receiver pair comprises:
a RF transmitter in a first fixed location within the monitored space that transmits a RF signal at a specified frequency; and
a RF receiver in a second fixed location within the monitored space configured to receive RF signals at the specified frequency; and
each RF transmitter/receiver pair has a different specified frequency; and
an RF occupancy analyzer configured to analyze the RF energy using a nonparametric online change-point detection algorithm to determine a change in occupancy within the monitored space and to output a change-in-occupancy signal corresponding to the change in occupancy.

16. The system according to claim 15, wherein the RF occupancy analyzer is further configured to analyze changes in the RF energy due to absorption of the RF energy by one or more occupants of the monitored space.

17. The system according to claim 15, further comprising a second system that receives the change-in-occupancy signal as an input and the RF occupancy analyzer is further configured to control one or more devices in the second system as a function of the change-in-occupancy signal.

18. The system according for claim 17, wherein the one or more devices comprise at least one of a HVAC device, a lighting device, and a security system device.

19. The system according to claim 15, wherein the second system includes a database that records events and the change-in-occupancy signal prompts the second system to record an event in the database.

20. The system according to claim 15, further comprising a non-RF sensor, wherein the RF occupancy analyzer is further configured to make a determination on occupancy as a function of the change-in-occupancy signal and an occupancy signal from the non-RF sensor.

21. The system according to claim 15, wherein the RF energy includes RF energy from a personal device and the RF occupancy analyzer is further configured to determine the change in occupancy as a function of the RF energy from the personal device.

22. The system according to claim 15, further comprising a sensor that senses a change in the monitored space, the RF occupancy analyzer including a machine-learning algorithm that uses input from the sensor to increase accuracy of the nonparametric online change-point detection algorithm.

* * * * *